R. F. DRISCOLL.
CORN PLANTER AND ATTACHMENT THEREFOR.
APPLICATION FILED MAR. 31, 1917.
1,258,754.
Patented Mar. 12, 1918.
2 SHEETS—SHEET 1.
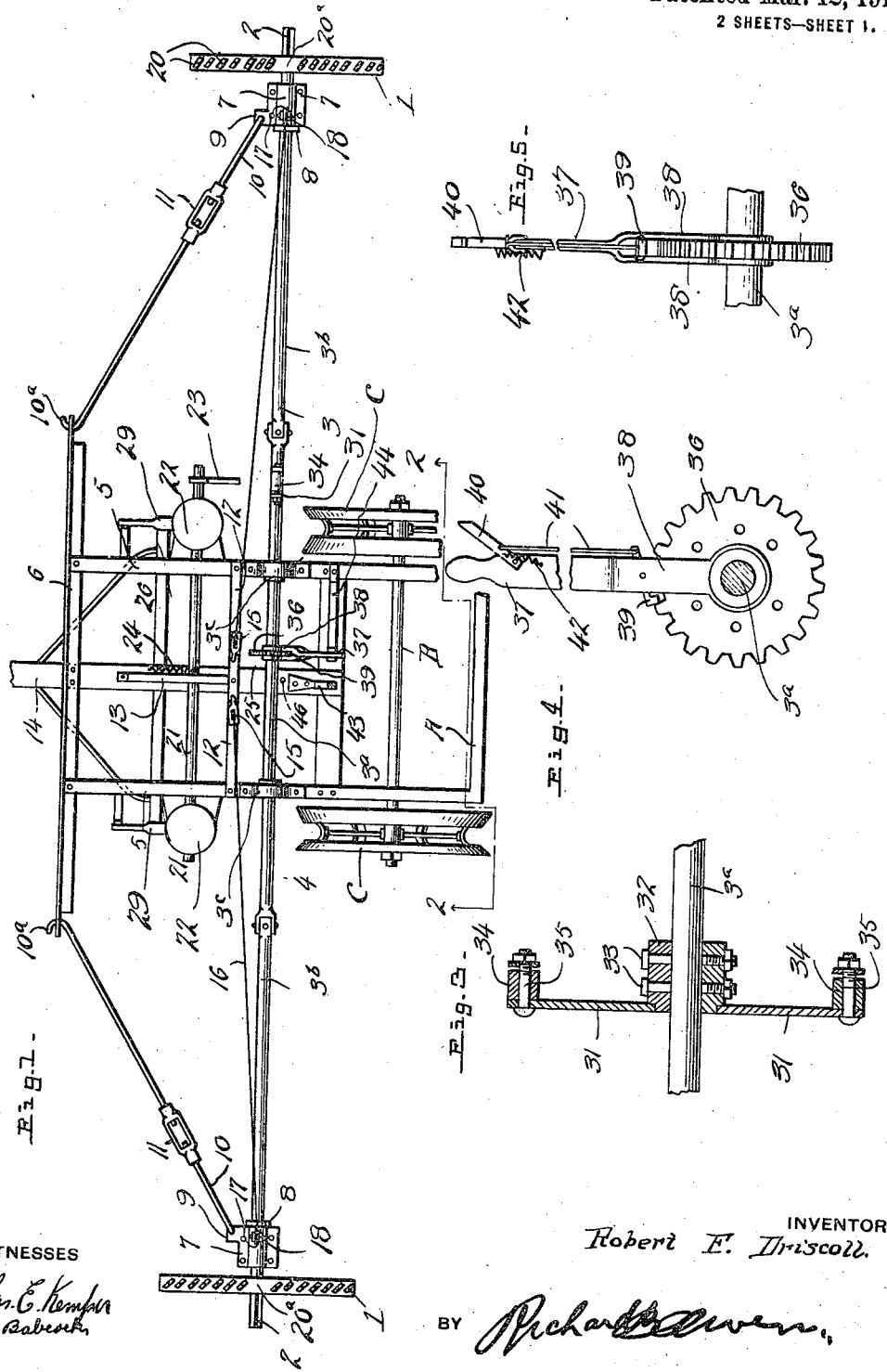
WITNESSES
Chas. E. Kempf
H. H. Babcock
INVENTOR
Robert F. Driscoll.
BY Richard Bowen
ATTORNEY

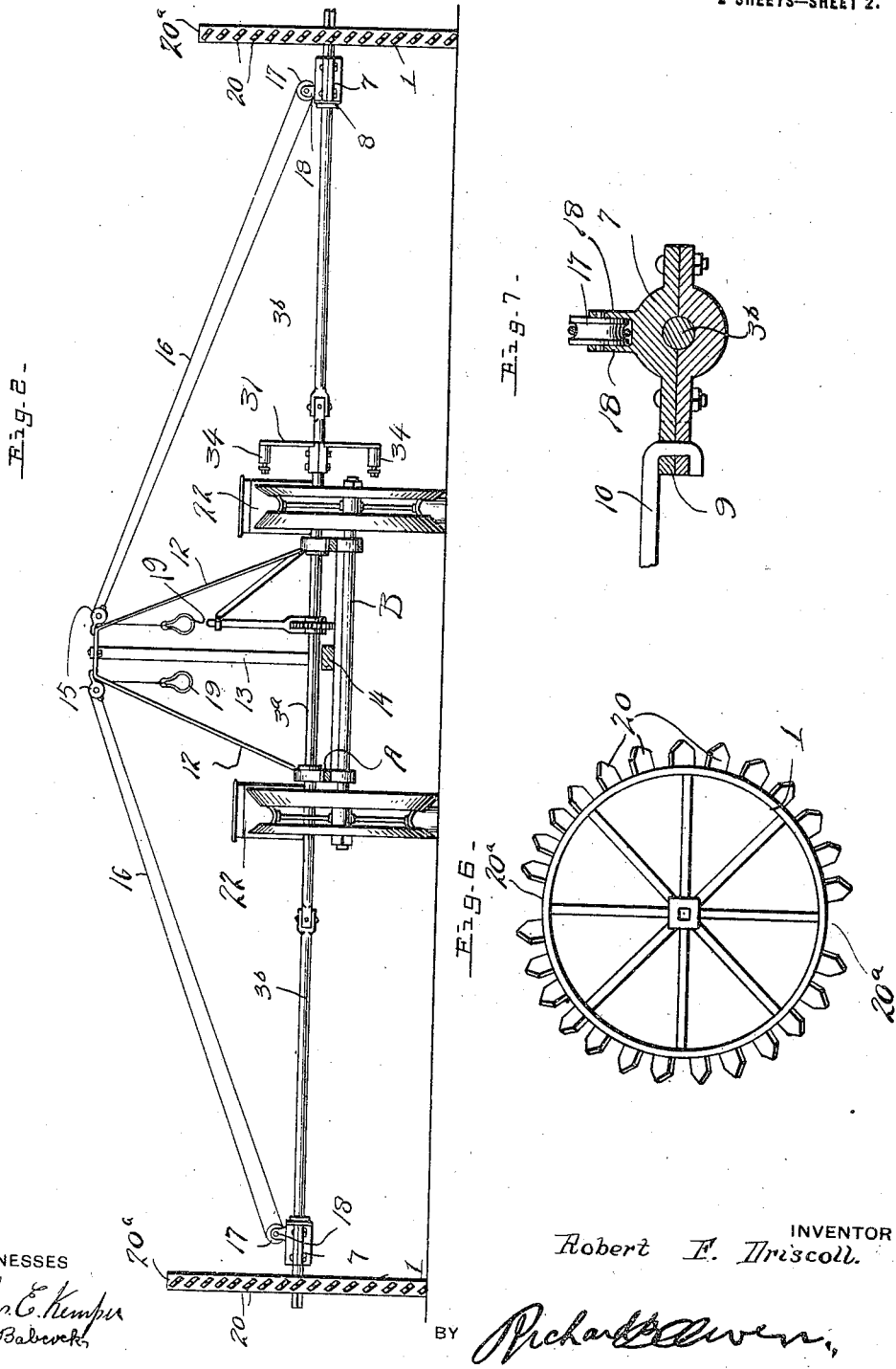

UNITED STATES PATENT OFFICE.

ROBERT F. DRISCOLL, OF DANBURY, IOWA.

CORN-PLANTER AND ATTACHMENT THEREFOR.

1,258,754.

Specification of Letters Patent. Patented Mar. 12, 1918.

Application filed March 31, 1917. Serial No. 158,909.

*To all whom it may concern:*

Be it known that I, ROBERT F. DRISCOLL, a citizen of the United States, residing at Danbury, in the county of Woodbury and State of Iowa, have invented certain new and useful Improvements in Corn-Planters and Attachments Therefor, of which the following is a specification.

This invention relates to corn planter attachments and more particularly to an attachment for a corn planter which operates on the principle of a check row planter.

One of the main objects of the invention is to provide a planter attachment of the character stated in which the usual check wire and tripping forks are eliminated, being replaced by a continuously rotated tripping device. A further object is to provide an attachment having simple and efficient marking means. A still further object is to provide an attachment which can be quickly and easily applied to any corn planter of standard construction. Further objects will appear from the detailed description.

In the drawings:—

Figure 1 is a plan view of the attachment as applied,

Fig. 2 is a section on line 2—2 of Fig. 1.

Fig. 3 is a detail sectional view of the tripping lever,

Fig. 4 is a detail of the means for centering the tripping shaft drive wheels,

Fig. 5 is a front view of the same,

Fig. 6 is a side view of one of the drive wheels, and

Fig. 7 is a fragmentary detail view of one of the bracket blocks for raising the trip shaft end sections.

The planter has the usual rectangular frame A provided with the axle B at each end of which is mounted a covering and ground wheel C. Drive wheels 1 are secured on the outer squared portions 2 of the trip shaft 3 rotatably mounted on frame A. This shaft consists of a central section $3^a$, and end sections $3^b$ secured to the ends thereof by universal joints 4. The central section $3^a$ is rotatably mounted in bearing blocks $3^c$ on the side bars 5 of the planter frame, the front ends of which are secured to a transversely extending angle bar 6.

Heavy clamps 7 are secured about the end sections $3^b$ of the shaft, near the outer ends thereof. A collar 8 is fixedly secured to each shaft section, inside of the clamp and closely adjacent thereto. These collars prevent inward movement of the clamps longitudinally of the shaft while permitting free rocking of the clamps on the shaft. Each clamp is provided with an integral ear 9 which is apertured to loosely receive one end of a stay rod 10, the other end of which is loosely secured through one end of the angle bar 6. A turn buckle 11 is interposed in each stay rod so as to adjust the tension thereof. These stay rods normally prevent rearward movement of the shaft sections $3^b$ about the universal joints 4. As will be noted from Fig. 1, the hooks $10^a$ at the forward ends of stay rods 10, when inserted through the ends of angle bar 6 are in alinement longitudinally of the planter frame with universal joints 4. This permits vertical movement of the outer sections $3^b$ of the trip shaft so that drive wheels 1 can rise and fall to accommodate an unevenness of the ground surface over which the planter is drawn.

An inverted V-frame 12 is secured to the frame side bars 5 at its lower ends, and is positioned slightly in advance of and parallel with the central shaft section $3^a$. This frame is held rigid by the forwardly and downwardly inclined brace bar 13 secured thereto, at its upper end, and secured to the tongue 14 at its lower end. A pulley block 15 is pivotally secured to each corner of the frame 12. A cable 16 is secured to each of the blocks 15, and is passed about the pulley 17 rotatably mounted between the lugs 18 projecting upwardly from the top of each clamp 7. This cable is then passed over the pulley carried by the block 15 and is provided, on its inner end, with a hand grip 19.

Each of the wheels 1 is provided with a plurality of radially extending teeth 20, diametrically opposite spaces $20^a$ being provided dividing the teeth into two sets or series. These teeth are arranged at an angle across the face of the wheel so as to provide gripping members. In addition to providing gripping members, the teeth also serve to mark where the wheel has traveled, a smooth space being left by the blank spaces $20^a$ which is not provided with teeth between the marks left by the teeth. The distance from the center of the tread portion of each drive wheel 1 to a point on the trip shaft in alinement with the center of the nearer seed hopper 22 is equal to one and a half times the distance between the centers of the seed hoppers, so that, when the row has been completed and the planter has been turned to plant a second set of rows, the proper planting distance can be maintained by following, with the inner wheel of the planter, the marks made by the outer wheel of the planter on its preceding trip. A seeding shaft 21 is rockably mounted in suitable bearings in the frame bars 5 in front of, and parallel with, the central shaft section 3ª of the trip shaft. Each end of this shaft is connected, to gearing mounted in the bottom of the seed hoppers 22 so as to distribute seed therefrom when the shaft is actuated, in the usual manner, the seed plates being of the hill-planting type. A trip arm 23 is secured on seeder shaft 21 near one end thereof. This arm extends rearwardly of the planter frame and is normally held in an approximately horizontal position by a tension spring 24 the outer end of which is secured to tongue 14 and the inner end to seeder shaft 21 above the axis of the same. This spring acts to normally hold shaft 21 in predetermined rotary position with trip arm 23 extending aproximately horizontally therefrom. Secured on the central section 3ª of the trip shaft is a pair of diametrically opposite radially extending arms 31. These arms are fixedly secured on a hub 32 which is secured by means of bolts 33 to the shaft section 3ª, these bolts pasing through the hub and the shaft. Each arm is provided, at its outer end, with a roller 34 rotatably mounted on a pivot bolt 35 secured through the arm. These arms are so positioned that, as the drive shaft is rotated, the rollers 34 engage the outer end of the tripping lever 23. As each roller engages the tripping lever it actuates the same so as to rock the seeding shaft 21 thus actuating the seed distributing mechanism so as to deposit a hill of corn into and through each shoe 29.

On the central section 3ª of the drive shaft is secured a ratchet wheel 36. A hand lever 37 is provided, at its lower end, with spaced arms 38 which straddle the ratchet wheel and are loosely mounted on the shaft section 3ª. This lever carries a dog 39 pivotally mounted thereon adapted to be moved into, or out of, engagement with the ratchet wheel by means of a latch lever 40 mounted at the upper end of the hand lever and a connecting rod 41 loosely secured thereto and to the dog 39. By means of this lever the trip shaft can be rotated to bring the drive wheels 1 into proper position for starting planting new rows, when the direction of travel of the planter is reversed. Normally the latch-lever 40 is held depressed by a tension spring 42 secured thereto and to the hand lever 37 so as to hold the dog 39 out of engagement with ratchet wheel 36 this permitting free rotation of the trip shaft. When it is desired to rotate the trip shaft manually, the latch-lever 40 is raised so as to bring dog 39 into engagement with ratchet wheel 36, as in Fig. 4 of the drawings. This hand-lever 37 is mounted closely adjacent the standard 43 for supporting a seat of usual construction, and is normally held in a slightly rearwardly inclined position by a bracket 44 secured to side bar 5 of the frame A and forked at its inner upper end to loosely receive the hand-lever, so as to be easily accessible.

This attachment may be quickly and easily applied to any planter of standard construction and eliminates entirely the usual check wire, tripping shaft, check wire forks and related parts, and the driving connections between the axle and seeder shaft and the tripping means therefor. In using this attachment, the drive wheels 1 are lowered into engagement with the ground and the planter is drawn across the field which it is desired to plant. During the initial trip of the planter across the field a guide line is marked midway between the two rows of corn planted. This may be accomplished by a suitable rod inserted through the tongue 14 at the center thereof, for which purpose the tongue is provided with a central aperture 46, the rod being held in a downwardly and slightly rearwardly inclined position during the progress of the planter. The drive wheels 1 are in lowered position during this trip of the planter so as to actuate the seeder shaft 21, the right hand wheel making a guide line to be later used. When the end of the field is reached both of the wheels 1 are lifted by means of the grips 19 so as to throw the planting mechanism out of operation while turning. Before starting on the return trip after the turn has been completed, the trip shaft is rotated so as to bring one of the spaces 20ª of the right hand wheel 1 into alinement with two hills of the two rows planted, this wheel being positioned with its central tread portion resting on the guide line made by the marking rod. During the return trip the trip rod is rotated as before and, as the tripping arms 31 are in the same plane as the spaces 20ª of wheels 1, the hills will be planted in alinement transversely of the field, and these rows will be equi-distant from each other. The two rows of corn planted on this return trip of the planter are also spaced equi-distant from the row of marks made by the right hand wheel 1 during the initial trip of the planter. On the third trip of the planter across the field, the left hand wheel 1 is brought into register with the row of marks between the second pair of rows planted, one of the spaces 20ª of this wheel being brought into register with one of the blank spaces in this row of marks. The two rows of corn planted by the planter on its third trip, which may be referred to as rows 5 and 6, will be equi-distant from the row of marks left by the right hand wheel 1 during the second trip of the planter. By this means I insure that the rows of corn will be planted equi-distant from each other, the hills of corn being in alinement transversely of the field, i. e., along lines extending at right angles to the direction of travel of the planter.

What I claim is:—

The combination with a corn planter having a supporting axle, ground wheels secured at each end of said axle, a frame carried by the axle, and a seeder shaft rockably mounted on said frame; of an operating shaft rotatably mounted on the frame parallel with, and in rear of, said seeder shaft, said shaft having a central section mounted on the frame and end sections secured to each end of said central section by universal joints, drive wheels secured to the end sections of said shaft adjacent the outer ends thereof, said drive wheels being provided with radially projecting gripping and marking members, resilient means for normally holding the seeder shaft rocked forwardly and downwardly in predetermined rotary position, a rearwardly projecting tripping arm secured on the seeder shaft, a tripping arm secured on the central section of the operating shaft positioned for engagement with the tripping arm of the seeder shaft whereby said seeder shaft will be intermittently rocked downwardly and rearwardly when the drive shaft is rotated, and means for raising one of the outer sections of the drive shaft so as to mark at one side of the machine only, or for raising both end sections so as to move the drive wheels out of engagement with the ground surface and stop the operation of the seeder shaft, optionally.

In testimony whereof I affix my signature in presence of two witnesses.

ROBERT F. DRISCOLL.

Witnesses:
CHAS. J. DRISCOLL,
E. A. TANGEMEN.

Copies of this patent may be obtained for five cents each, by addressing the "Commissioner of Patents, Washington, D. C."